(12) United States Patent
Handshaw et al.

(10) Patent No.: US 12,159,185 B2
(45) Date of Patent: Dec. 3, 2024

(54) SINGLE PLANE SLOT SCANNER SUPPORT FOR VISION CAMERA CONFIGURATIONS

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Joseph D. Giordano, Bayville, NY (US); Warren C. Zuelch, Wantagh, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 145 days.

(21) Appl. No.: 17/709,909

(22) Filed: Mar. 31, 2022

(65) Prior Publication Data

US 2023/0316019 A1 Oct. 5, 2023

(51) Int. Cl.
*G06K 7/10* (2006.01)
(52) U.S. Cl.
CPC ...... *G06K 7/10811* (2013.01); *G06K 7/10732* (2013.01); *G06K 7/10881* (2013.01); *G06K 2007/10524* (2013.01)
(58) Field of Classification Search
CPC .................................................. G06K 7/10811
USPC ................................................... 235/472.01
See application file for complete search history.

(56) References Cited

U.S. PATENT DOCUMENTS

| | | |
|---|---|---|
| 2008/0011856 A1 | 1/2008 | Bremer et al. |
| 2009/0057413 A1 | 3/2009 | Vinogradov et al. |
| 2009/0078775 A1 | 3/2009 | Giebel et al. |
| 2019/0362117 A1* | 11/2019 | Handshaw ......... G06K 7/10831 |
| 2020/0372228 A1* | 11/2020 | Rodriguez ............. G06Q 30/00 |
| 2021/0182517 A1* | 6/2021 | Handshaw ......... G06K 7/10831 |

OTHER PUBLICATIONS

International Search Report and Written Opinion for International Application No. PCT/US2023/015631 mailed on Aug. 4, 2023.

* cited by examiner

*Primary Examiner* — Rafferty D Kelly
(74) *Attorney, Agent, or Firm* — Yuri Astvatsaturov

(57) ABSTRACT

An imaging device includes a housing having an optically transmissive window, a first imaging assembly, and a second imaging assembly. A second imaging sensor of the second imaging assembly is positioned within a bottom portion of the housing height and a front portion of the housing depth. The second imaging sensor may be positioned in either a landscape orientation or a portrait orientation. A downstream region is defined between a downstream side of a first field of view of the first imaging sensor and a downstream side of a second field of view of the second imaging sensor to allow the imaging device to determine whether an indicia associated with a product captured within the downstream region was previously captured in the first field of view, thereby facilitating detection of scan avoidance or ticket switching.

12 Claims, 12 Drawing Sheets

SINGLE PLANE SLOT SCANNER SUPPORT FOR VISION CAMERA CONFIGURATIONS

BACKGROUND

Self-checkout stations for direct use by a customer are becoming more prolific in retail environments. The purpose of these stations is two-fold: to help the stores redirect their employees to perform other important tasks, and to help customers get what they need more quickly. Since an employee is not always monitoring each self-checkout station directly, users can misuse the self-checkout station by, for example, not scanning items that they are taking out of the store (scan avoidance), by scanning incorrect items (ticket switching), or by purchasing age-restricted items. Traditional scanners having a single imaging sensor, while effective in various implementations, can nonetheless lack the ability to detect scan avoidance, ticket switching, or to see a user's face for identification purposes in the event of misuse of the scanner.

SUMMARY

In accordance with a first aspect, an imaging device is configured for placement in a vertical position on a flat surface or for placement in a horizontal position. The imaging device includes a housing, a first imaging assembly, and a second imaging assembly. The housing has a window that is optically transmissive. The housing has a housing width between a first side and a second side along a x-axis, a housing height between a top and a bottom along an y-axis, and a housing depth between a front and a back along a z-axis. The first imaging assembly includes a first imaging sensor having a first field of view (FOV) extending through the window. The first imaging assembly is configured to decode indicia data captured within the first FOV. The second imaging assembly includes a second imaging sensor having a second field of view (FOV) extending through the window. The second imaging assembly is configured to capture images in the second FOV. The second imaging sensor is positioned along the y-axis within a bottom portion of the housing height and along the z-axis within a front portion of the housing depth relative to the window. The bottom of the housing is located on the flat surface in the vertical position, the front is aligned with the window, and the first side and the second side are between the top and the bottom.

In a variation, an illumination emitter may be configured to generate illumination light visible through the window. The illumination emitter may be positioned along the y-axis within a top portion of the housing height. The second imaging sensor may be positioned to direct the second FOV upwardly with respect to a horizontal plane, and the illumination emitter may be positioned to direct the illumination light downwardly with respect to the horizontal plane. The illumination light may be directed to illuminate all of the second FOV up to four inches away from the front of the housing along the z-axis.

In some approaches, the bottom portion may be a bottom third of the housing height along the y-axis. The front portion may be within 1.5 inches of the front along the z-axis. The top portion may be a top third of the housing height along the y-axis.

In other examples, the bottom portion may be a bottom half of the housing height along the y-axis, and a central axis of the first imaging sensor may be positioned along the y-axis within a top half of the housing height. The first imaging sensor may be positioned to direct the first FOV downwardly with respect to a horizontal plane. The second imaging sensor may be positioned to direct the second FOV upwardly with respect to a horizontal plane. The first FOV may be directed downwardly with respect to the horizontal plane at an angle between 5 and 20 degrees, and the second FOV may be directed upwardly with respect to the horizontal plane at an angle between 10 and 45 degrees. The first FOV may cover at least half of the window, and the second FOV may cover at least half of the window.

In a variation, the second imaging sensor may be configured to capture color images in the second FOV. The color images may be used for at least one of a video stream, a ticket switching application, a scan avoidance application, facial recognition, gesture recognition, a convolutional neural network based application, and product identification.

In still further examples, the housing may have a baffle adjacent a top of the window, the baffle configured to limit an illumination height of the illumination light generated by the illumination emitter.

In accordance with a second aspect, an imaging device is configured for placement on a flat surface in a vertical position or for placement in a horizontal position. The imaging device includes a housing, a first imaging assembly, a second imaging assembly, and an illumination emitter. The housing has a window that is optically transmissive, the window positioned substantially vertically in the vertical position. The first imaging assembly includes a first imaging sensor having a first field of view (FOV) extending through the window, the first imaging assembly being configured to decode indicia data captured within the first FOV. The second imaging assembly includes a second imaging sensor having a second field of view (FOV) extending through the window, the second imaging assembly being configured to capture images in the second FOV. The second FOV has a second FOV width and a second FOV height. The illumination emitter is configured to generate illumination light visible through the window. The second imaging sensor is positioned by the second imaging assembly within the housing in a landscape orientation or a portrait orientation, the second FOV width being greater than the second FOV height in the landscape orientation, the second FOV width being less than the second FOV height in the portrait orientation.

In a variation, the first FOV may have a first FOV upstream side, a first FOV downstream side, and a first FOV width between the first FOV upstream side and the first FOV downstream side. The second FOV may have a second FOV upstream side, a second FOV downstream side, and a second FOV width between the second FOV upstream side and the second FOV downstream side. When the second imaging sensor is positioned in the landscape orientation, the second FOV upstream side may extend beyond the first FOV upstream side outside the first FOV and the second FOV downstream side extending beyond the first FOV downstream side outside the first FOV, the first FOV width being 80 percent or less of the second FOV width.

In some approaches, the first FOV may have a first FOV bottom side. The second FOV may have a second FOV top side and a second FOV bottom side. When the second imaging sensor is positioned in the portrait orientation, the second FOV bottom side may be substantially aligned with the first FOV bottom side. When the second imaging sensor is positioned in the portrait orientation, the second imaging assembly being configured to capture images of a face of a user in the second FOV by having the second FOV top side positioned above the face of the user when the imaging device is positioned on a standard counter.

In other examples, the housing may have a window that is optically transmissive. The first imaging assembly may include a first imaging sensor having a first field of view (FOV) extending through the window, the first imaging assembly being configured to decode indicia data captured within the first FOV. The second imaging assembly may include a second imaging sensor having a second field of view (FOV) extending through the window, the second imaging assembly being configured to capture images in the second FOV, the second FOV having a second FOV top side. The illumination emitter may be configured to generate illumination light visible through the window. The second FOV may overlap at least 75 percent of the first FOV at the window, and the second imaging assembly being configured to capture images of a face of a user in the second FOV by having the second FOV top side positioned above a head of the user. A mirror arrangement may be positioned within the housing to direct the first FOV, the mirror arrangement including an output mirror. The second imaging sensor may be located below the output mirror, the second imaging sensor being positioned to direct the second FOV upwardly with respect to a horizontal plane. The imaging device may be configured for placement within a kiosk in a kiosk housing below a display of the kiosk. The second imaging sensor may be configured to capture color images in the second FOV.

In accordance with a third aspect, an imaging device comprises a housing, a first imaging assembly, a second imaging assembly, and an illumination emitter. The housing has a window that is optically transmissive. The first imaging assembly includes a first imaging sensor having a first field of view (FOV) extending through the window, the first imaging assembly being configured to decode indicia data captured within the first FOV, the first FOV having a first FOV upstream side and a first FOV downstream side. The second imaging assembly includes a second imaging sensor having a second field of view (FOV) extending through the window, the second imaging assembly being configured to capture images in the second FOV, the second FOV having a second FOV upstream side and a second FOV downstream side. The illumination emitter is configured to generate illumination light visible through the window. The second FOV upstream side extends beyond the first FOV upstream side, and the second FOV downstream side extends beyond the first FOV downstream side outside the first FOV. A downstream region within the second FOV is defined between the first FOV downstream side and the second FOV downstream side.

In a variation, the second imaging sensor may be configured to capture color images in the second FOV.

In another example, the second imaging assembly may be configured to capture images to identify an indicia associated with a product between the first FOV downstream side and the second FOV downstream side. The imaging device may further be configured to determine whether the indicia associated with the product was captured as indicia data in the first FOV.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
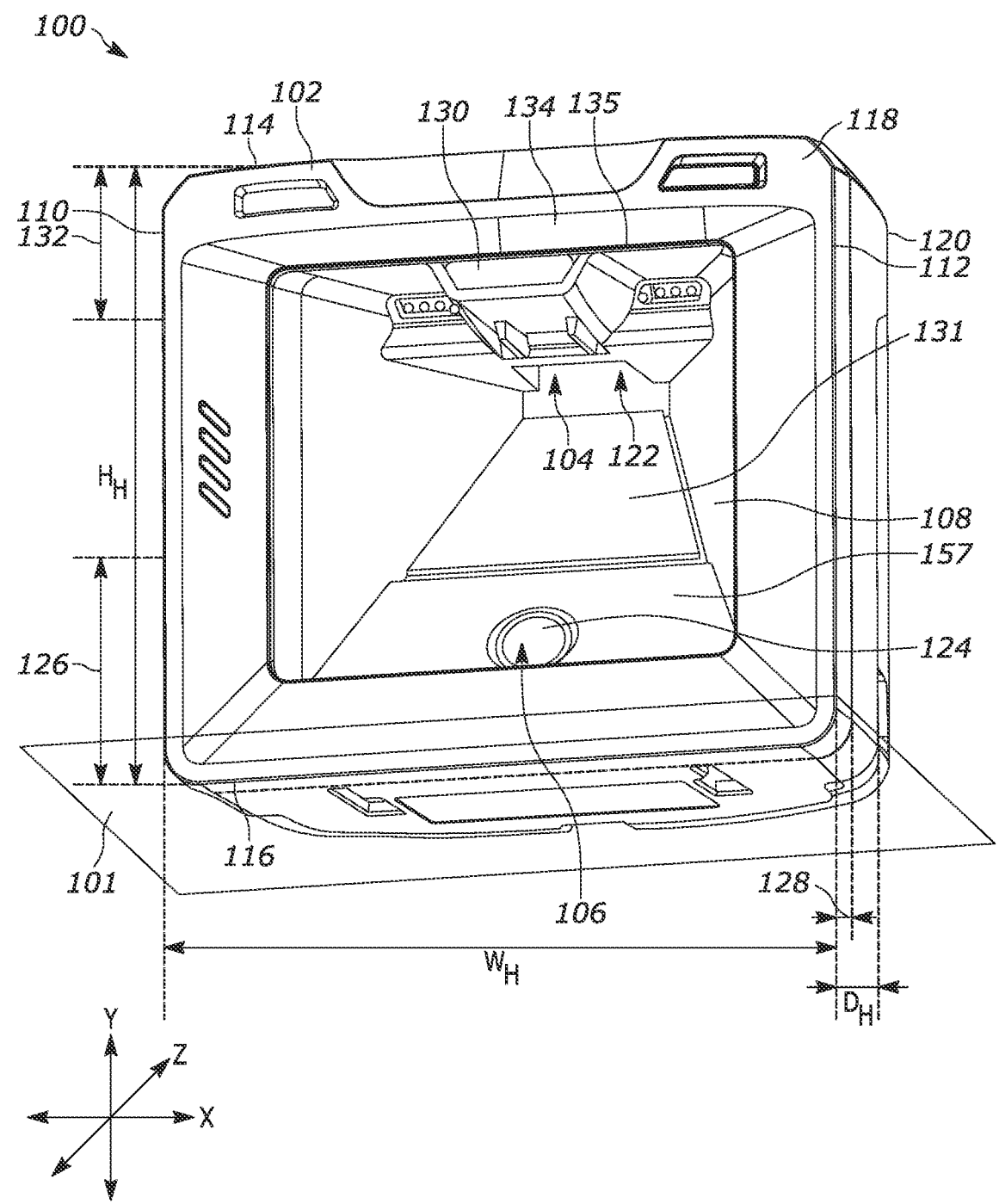
FIG. 1 illustrates a perspective view of an example imaging device in a vertical position having a first imaging sensor and a second imaging sensor.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, an imaging device having two imaging sensors is disclosed. The first imaging sensor may include, for example, a monochrome imager and may be configured to capture image data for barcode decode purposes by a decoder assembly. The second imaging sensor may, for example, have a color imaging sensor configured to capture image data primarily for non-barcode-decode purposes. The second imaging sensor may be positioned in a portrait orientation or in a landscape orientation. The imaging device may be positioned to have an overall field of view that includes a user's face for facial recognition applications and to facilitate detection of scan avoidance and ticket switching.

Figure 12:
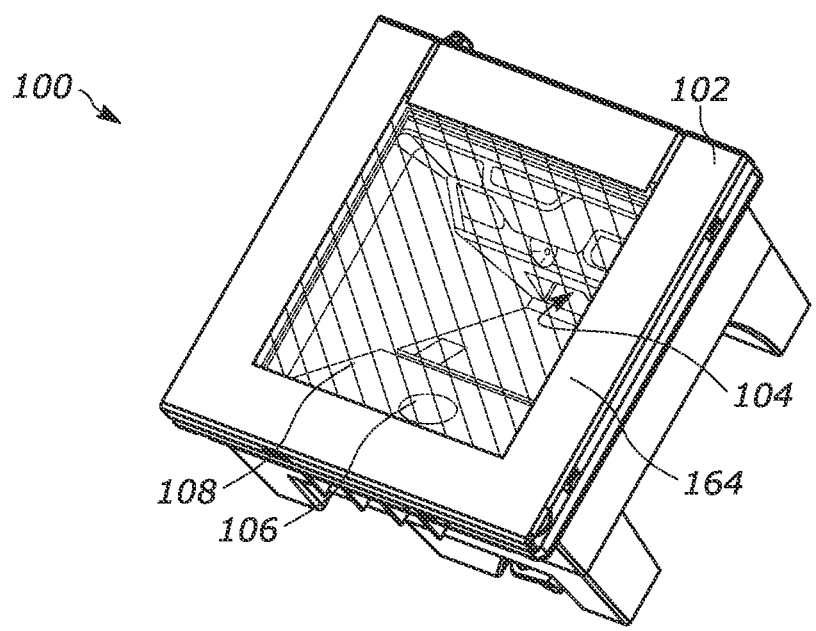
FIG. 12 illustrates an example imaging device in a horizontal position.

Turning to FIG. 1, an imaging device 100 includes a housing 102, a first imaging assembly 104, and a second imaging assembly 106. The imaging device 100 is configured for placement in a vertical position on a flat surface 101, as shown, or can alternately be placed in a horizontal position (as shown in FIG. 12). The housing 102 incudes a window 108 that is optically transmissive, thereby allowing the first imaging assembly 104 and the second imaging assembly 106 to collect images through the window. In the arrangement depicted, the window 108 is positioned substantially vertically. In other arrangements, the window 108 may be positioned substantially horizontally or at an angle between vertical and horizontal. The housing 102 has a housing width $W_H$ between a first side 110 and a second side 112 along an x-axis, a housing height $H_H$ between a top 114 and a bottom 116 along a y-axis, and a housing depth DH between a front 118 and a back 120 along a z-axis. The bottom 116 is located on the flat surface 101 in the vertical position. The front 118 is parallel to the window 108, and the window is recessed slightly from the front 118 by, for example, 5 millimeters. The first side 110 and the second side 112 extend between the top 114 and the bottom 116.

The first imaging assembly 104 includes a first imaging sensor 122, and the second imaging assembly 106 includes a second imaging sensor 124. The second imaging sensor 124 is positioned along the y-axis within a bottom portion 126 of the housing height $H_H$ and along the z-axis within a front portion 128 of the housing depth DH relative to the window 108. The bottom portion 126 may be a bottom half, a bottom third, or a bottom quarter of the housing height $H_H$. The front portion 128 may be within 0.5 to 3 inches of the front 118 along the z-axis. In particular, the front portion may be within 1.5 inches of the front 118 along the z-axis.

The imaging device 100 may further include an illumination emitter 130 configured to generate illumination light visible through the window 108. The illumination emitter 130 provides light to at least partially illuminate the fields of view of the first imaging sensor 122 and the second imaging sensor 124 (identified and discussed as first field of view 136 and second field of view 138 below) and thereby facilitate image capture. The illumination emitter 130 may be positioned along the y-axis within a top portion 132 of the housing height $H_H$ when the imaging device 100 is in the vertical position. The top portion 132 may be a top half, a top third, or a top quarter of the housing height $H_H$. The housing 102 includes a baffle 134 adjacent a top 135 of the window 108 to limit the spread of the illumination light generated by the illumination emitter 130. In particular, when the imaging device 100 is in the vertical position, the baffle 134 may limit an illumination height of the illumination light generated by the illumination emitter 130. The baffle 134 is configured to prevent light from unnecessarily shining into a user's eyes. A separate lens or a diffuser (not depicted) positioned in front of the illumination emitter 130 may focus or diffuse illumination light.

The first imaging sensor 122 (shown in FIG. 8) has a first field of view (FOV) 136 (shown in FIG. 2) extending through the window 108. The first imaging assembly 104 (shown in FIG. 8) is configured to capture images that may be used to decode indicia data, such as barcodes, captured within the first FOV 136 (shown in FIG. 2). The second imaging sensor 124 (shown in FIG. 8) has a second field of view (FOV) 138 (shown in FIG. 2) extending through the window 108. The second imaging assembly 106 (shown in FIG. 8) is configured to capture images in the second FOV 138 (shown in FIG. 2). Specifically, the second imaging assembly 106 may be configured to capture color images in the second FOV 138. The color images may be used for at least one of a video stream, a ticket switching application, a scan avoidance application, facial recognition, gesture recognition, a convolutional neural network based application, and product identification.

Figure 2:
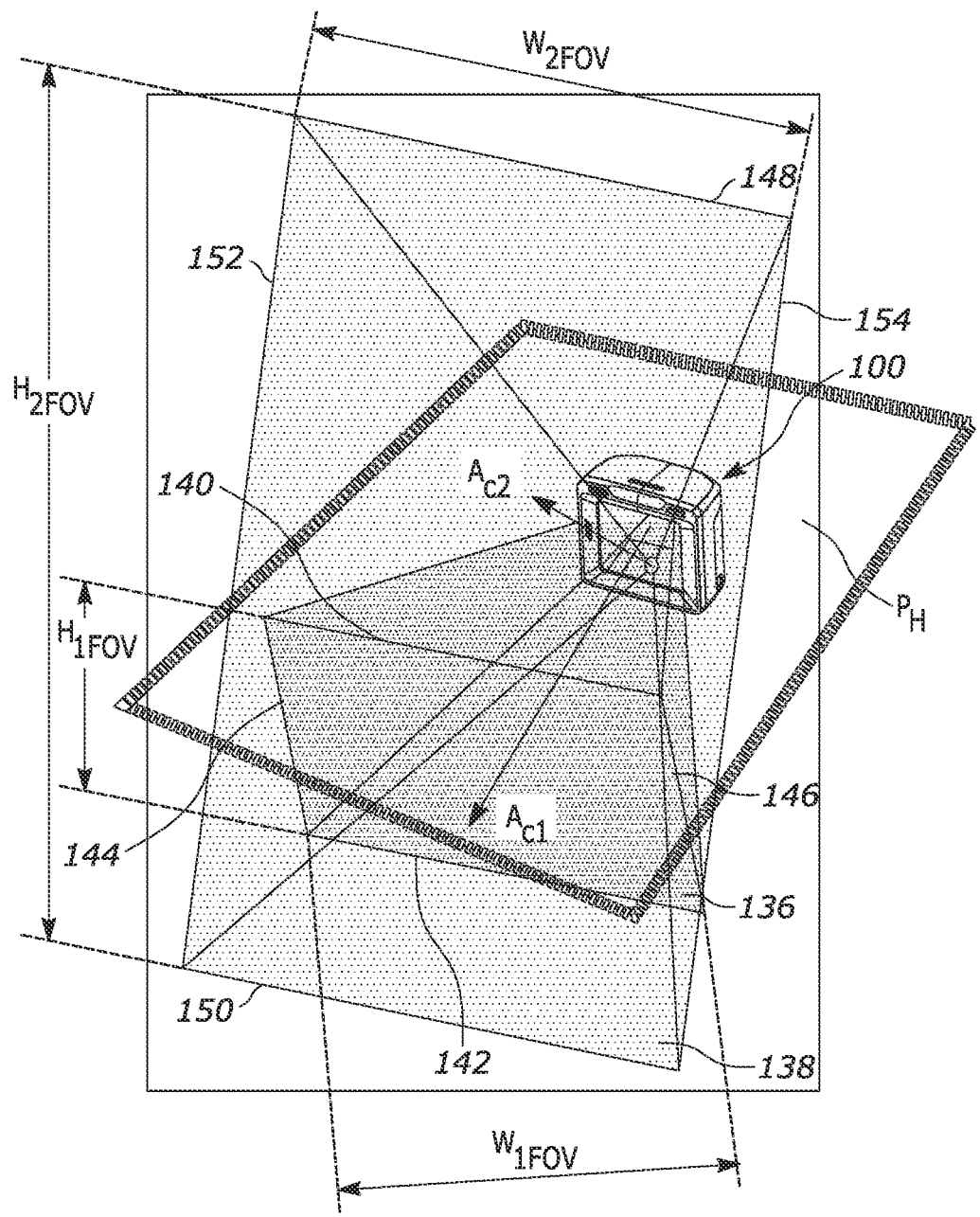
FIG. 2 illustrates a perspective view of the example imaging device of FIG. 1 with the second imaging sensor positioned in a portrait orientation.
Figure 3:
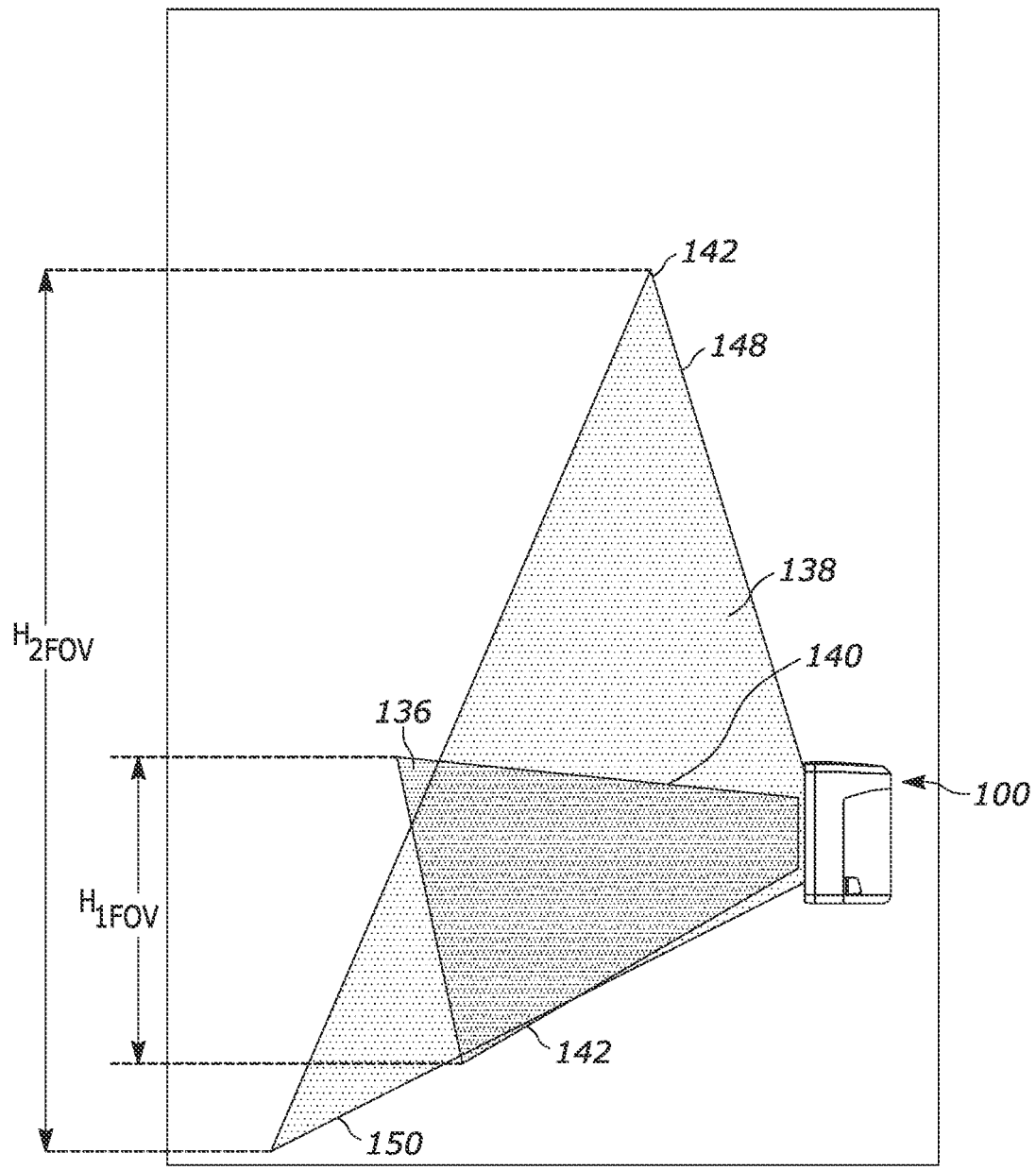
FIG. 3 illustrates a side view of the example imaging device of FIGS. 1 and 2 with the second imaging sensor positioned in the portrait orientation.
Figure 8:
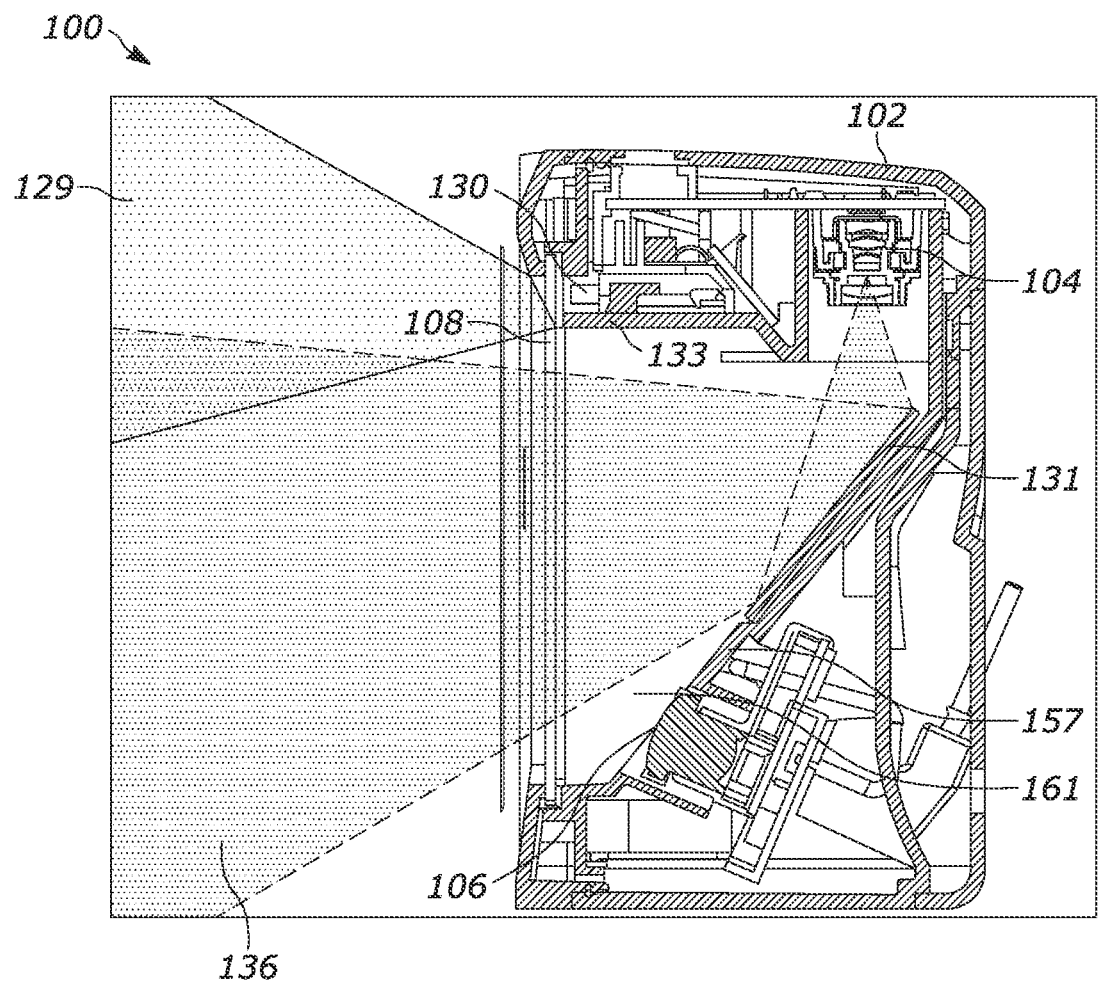
FIG. 8 illustrates a side cross-sectional view of the example imaging device of FIGS. 1-3.

As shown in FIG. 1 and discussed further with respect to FIG. 8 below, a chassis 157 is positioned within the housing 102. In conjunction with the window 108, the chassis 157 forms an optical cavity (shown in FIG. 8) in which the first imaging assembly 104, the second imaging assembly 108, and the illumination emitter 130 are positioned. As also shown in FIG. 1 and discussed further with respect to FIG. 8 below, a mirror 131 is provided forward of which the illumination emitter 130 is positioned. As shown in FIG. 2, the first FOV 136 is directed downwardly with respect to a horizontal plane $P_H$. For example, a centroidal axis $A_{c1}$ of the first FOV 136 may be directed downwardly from the window 108 with respect to the horizontal plane $P_H$ at an angle between 5 and 20 degrees and may cover at least half of the window 108. The second FOV 138 is directed upwardly with respect to the horizontal plane $P_H$. For example, a centroidal axis $A_{c2}$ of the second FOV 138 may be directed upwardly from the window 108 with respect to the horizontal plane $P_H$ at an angle between 10 and 45 degrees and may cover at least half of the window 108. Because the first FOV 136 and the second FOV 138 are angled differently, the combination of the first FOV 136 and the second FOV 138 enables the imaging device 100 to see multiple sides of an item for improved ticket switching detection. The second FOV 138 may overlap at least 75 percent of the first FOV 136 at the window 108 (shown in FIG. 1).

The illumination emitter 130 (shown in FIG. 1) is positioned to direct the illumination light downwardly with respect to the horizontal plane $P_H$ (shown in FIG. 2). In some arrangements, the illumination emitter 130 (shown in FIG. 1) may be directed to illuminate all of the second FOV 138 (shown in FIG. 2) up to four inches away from the front 118 of the housing 102 (shown in FIG. 1) along the z-axis. In some arrangements, the illumination emitter 130 (shown in FIG. 1) may be directed to illuminate 50% or more of the second FOV 138 (shown in FIG. 2) within the first five inches away from the front 118 of the housing 102 along the z-axis.

Figure 5:
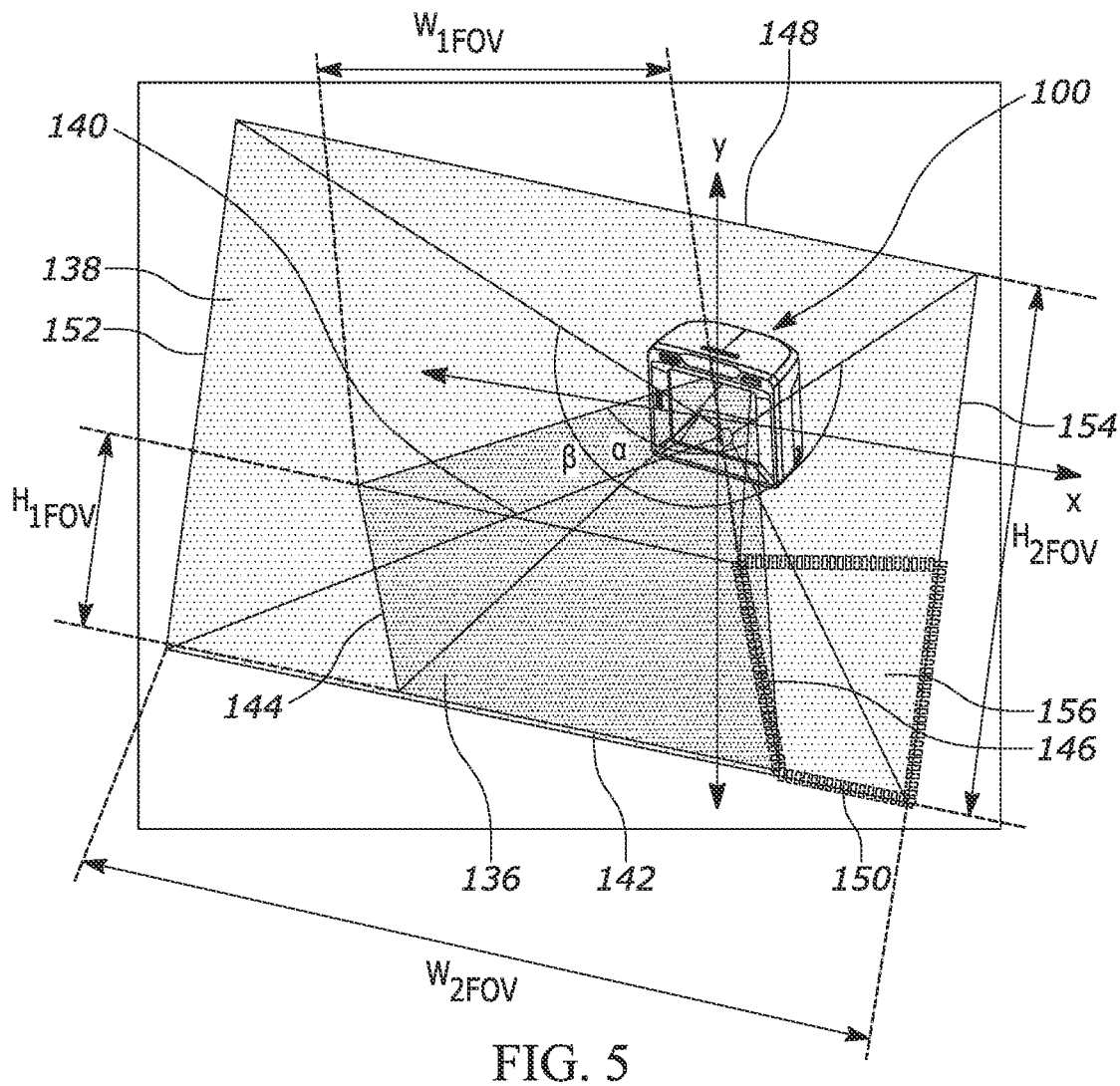
FIG. 5 illustrates a perspective view of the example imaging device of FIG. 1 with the second imaging sensor positioned in a landscape orientation.

As shown in FIGS. 2, 3, 5, and 6, the first FOV 136 has a first FOV height $H_{1FOV}$ extending between a first FOV top side 140 and a first FOV bottom side 142. As shown in FIGS. 2 and 5, the first FOV 136 also has a first FOV width $W_{1FOV}$ extending between a first FOV upstream side 144 and a first FOV downstream side 146. When a user checks out using the imaging device 100, the user may swipe a product from the first FOV upstream side 144 to the first FOV downstream side 146.

As also shown in FIGS. FIGS. 2, 3, 5, and 6, the second FOV 138 has a second FOV height $H_{2FOV}$ extending between a second FOV top side 148 and a second FOV bottom side 150. The second FOV may be configured to capture images of a face of a user in the second FOV by having the second FOV top side 148 positioned above a head of the user. As shown in FIGS. 2 and 5, the second FOV 138 also has a second FOV width $W_{2FOV}$ extending between a second FOV upstream side 152 and a second FOV downstream side 154. When a user checks out using the imaging device 100, the user may swipe a product from the second FOV upstream side 152 to the second FOV downstream side 154.

As shown in FIG. 5, the second FOV upstream side 152 may extend beyond the first FOV upstream side 144 and the second FOV downstream side 154 may extend beyond the first FOV downstream side 146 in some arrangements. A downstream region 156 may be defined between the first FOV downstream side 146 and the second FOV downstream side 154 (as shown in FIG. 5). The second imaging assembly 106 is configured to capture images used to identify an indicia associated with a product within the downstream region 156, and the imaging device 100 may be further configured to determine whether the indicia associated with the product was captured as indicia data in the first FOV 136. In this way, the second imaging assembly 106 may be used by the imaging device 100 to detect scan avoidance and/or ticket switching.

Figure 4:
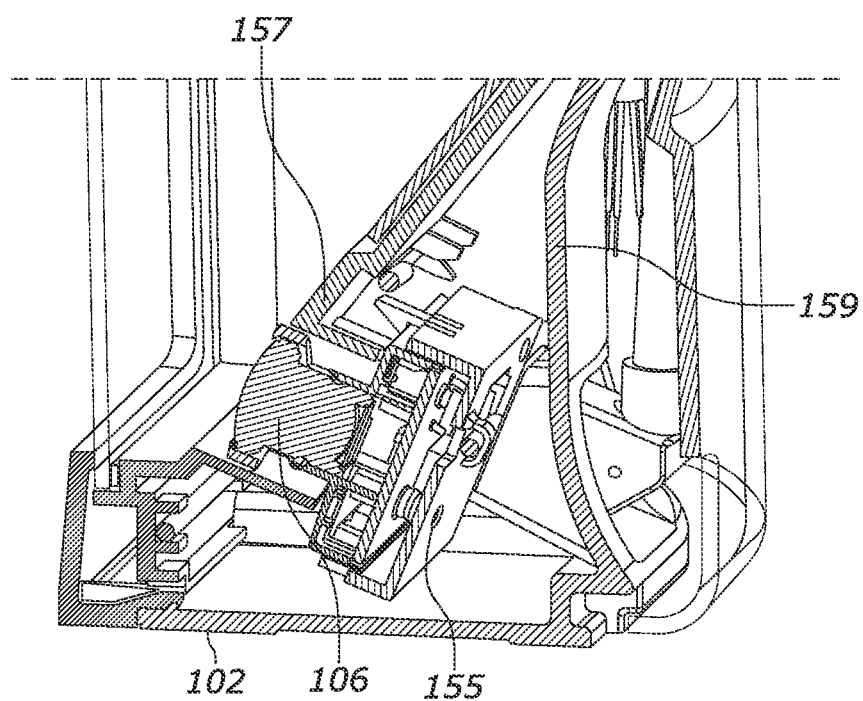
FIG. 4 illustrates a side cross-sectional view of the example imaging device of FIGS. 1-3 with the second imaging sensor positioned in the portrait orientation.
Figure 6:
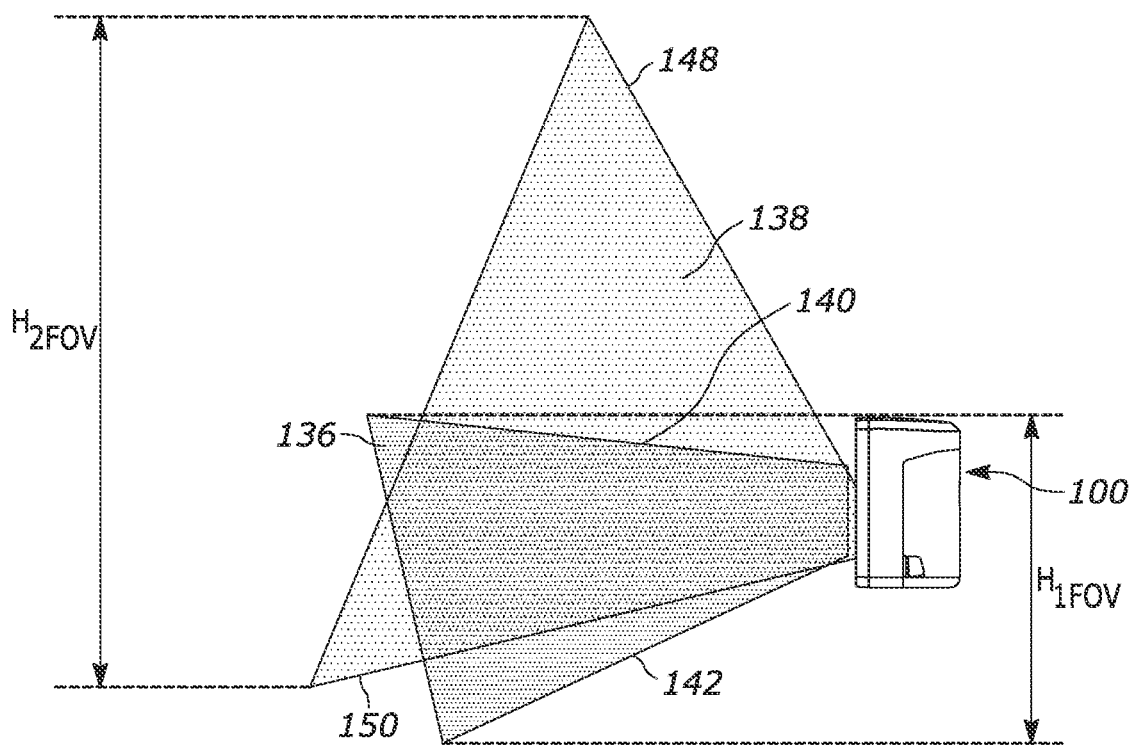
FIG. 6 illustrates a side view of the example imaging device of FIGS. 1 and 5 with the second imaging sensor positioned in the landscape orientation.
Figure 7:
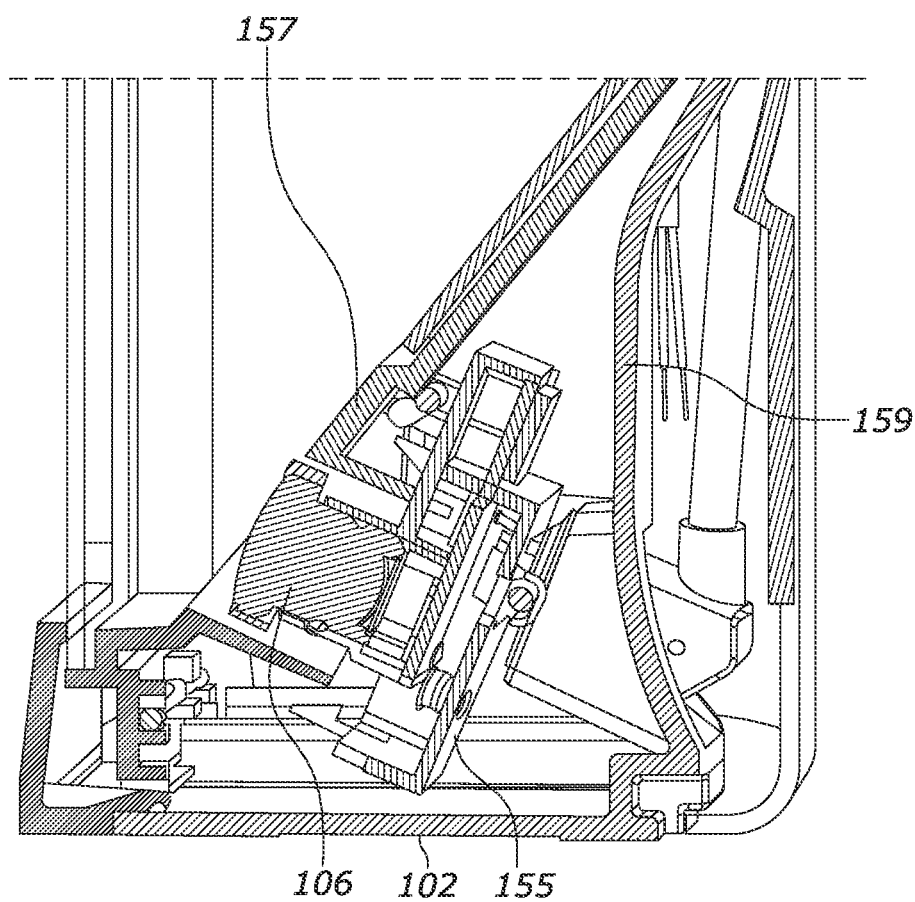
FIG. 7 illustrates a side cross-sectional view of the example imaging device of FIGS. 1, 5, and 6 with the second imaging sensor positioned in the landscape orientation.

The second imaging sensor 124 may be positioned by the second imaging assembly 106 in either a portrait orientation (shown in FIGS. 2-4) and a landscape orientation (shown in FIGS. 5-7). FIGS. 4 and 7 illustrate a mounting assembly 155 that may be used to mount the second imaging assembly 106 in a portrait orientation or a landscape orientation with enough space within the housing 102 for the mounting assembly 155 to be rotated 90 degrees. FIGS. 4 and 7 further illustrate a chassis 157 positioned around the second imaging assembly 106 that serves to direct the second FOV 138. The mounting assembly 155 can be snapped, screwed, or otherwise secured in place against the chassis 157. Alternatively, the mounting assembly 155 can be secured between the chases 157 and a rear portion 159 of the housing 102. The chassis 157 may be further configured to secure in part or in whole the first imaging assembly 108 (shown in an alternate arrangement in FIG. 8), any mirror assemblies (such as mirror arrangement 158 shown in FIG. 10), a printed circuit board (PCB), and/or the window 108.

As shown in FIGS. 5 and 2, respectively, the second FOV width $W_{2FOV}$ is greater than the second FOV height $H_{2FOV}$ in the landscape orientation, and the second FOV width $W_{2FOV}$ is less than the second FOV height $H_{2FOV}$ in the portrait orientation. In the arrangement shown in FIG. 3 with the second imaging sensor 124 positioned in the portrait orientation, the second FOV bottom side 150 is substantially aligned with the first FOV bottom side 142, and the second imaging assembly 106 is configured to capture images of a face of a user in the second FOV 138 by having the second FOV top side 148 positioned above the face of the user when the imaging device 100 is positioned on a standard counter. For purposes of this application, the height of a standard counter is defined as 36 inches. In the arrangement shown in FIG. 5 with the second imaging sensor 124 positioned in the landscape orientation, the second FOV upstream side 152 extends beyond the first FOV upstream side 144 outside the first FOV 136 and the second FOV downstream side 154 extends beyond the first FOV downstream side 146 outside the first FOV 136 such that the first FOV width $W_{1FOV}$ is eighty percent or less of the second FOV width $W_{2FOV}$. Put another way, when the imaging device 100 is in a vertical position, a first divergence angle β between the first FOV upstream side 144 and the first FOV downstream side 156 that is normal to the plane formed by the horizontal x-axis and the vertical y-axis is less than a second divergence angle β between the second FOV upstream side 152 and the second FOV downstream side 154. FIG. 8 illustrates a cross-sectional view of the imaging device 100, including the housing 102, a first imaging assembly 104, and a second imaging assembly 106. In the arrangement show, the first imaging assembly 104 is directed downward when the imaging device 100 is in the vertical position. A mirror 131 is then positioned such that the first FOV 136 is directed through the window 108. In this way, the origin of the first FOV 136 is below the imaging assembly 104. In other arrangements, the first imaging assembly 104 may be directed in a different direction and no mirrors or more than one mirror may be used to ultimately direct the first FOV 136 through the window 108. As shown in FIG. 8, bot the first imaging assembly 104 and the second imaging assembly 106 are located within a shared optical cavity 161 created by and located between the chassis 157 and the window 108.

Figure 9:
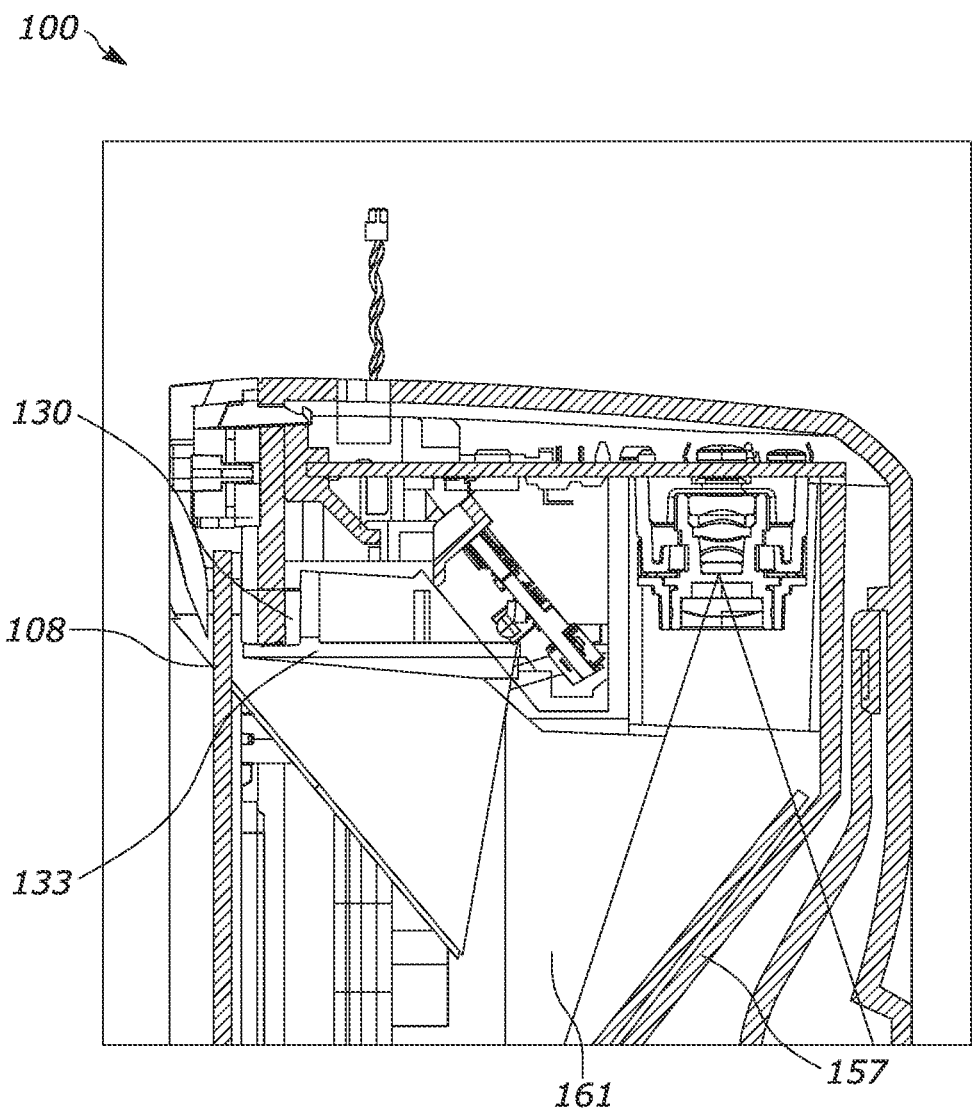
FIG. 9 illustrates a cross-sectional view of the illumination emitter 130 in the imaging device 100 of FIGS. 1-8. As shown, the illumination emitter 130 is positioned to direct illumination downward when the imaging device 100 is in the vertical position. A mirror 131 is then positioned to redirect the illumination through the window

FIG. 9 provides an enlarged cross-sectional view of the illumination emitter 130 of the imaging device 100. As shown in FIGS. 8 and 9, a ceiling 133 within the imaging device 100 limits how the illumination can be directed in conjunction with the baffle 134 (discussed above and shown in FIG. 1). As also shown in FIGS. 8 and 9, the illumination emitter 130 is located within the shared optical cavity 161 created by and located between the chassis 157 and the window 108. FIG. 8 illustrates a field of illumination 129 created by the illumination emitter 130.

Figure 10:
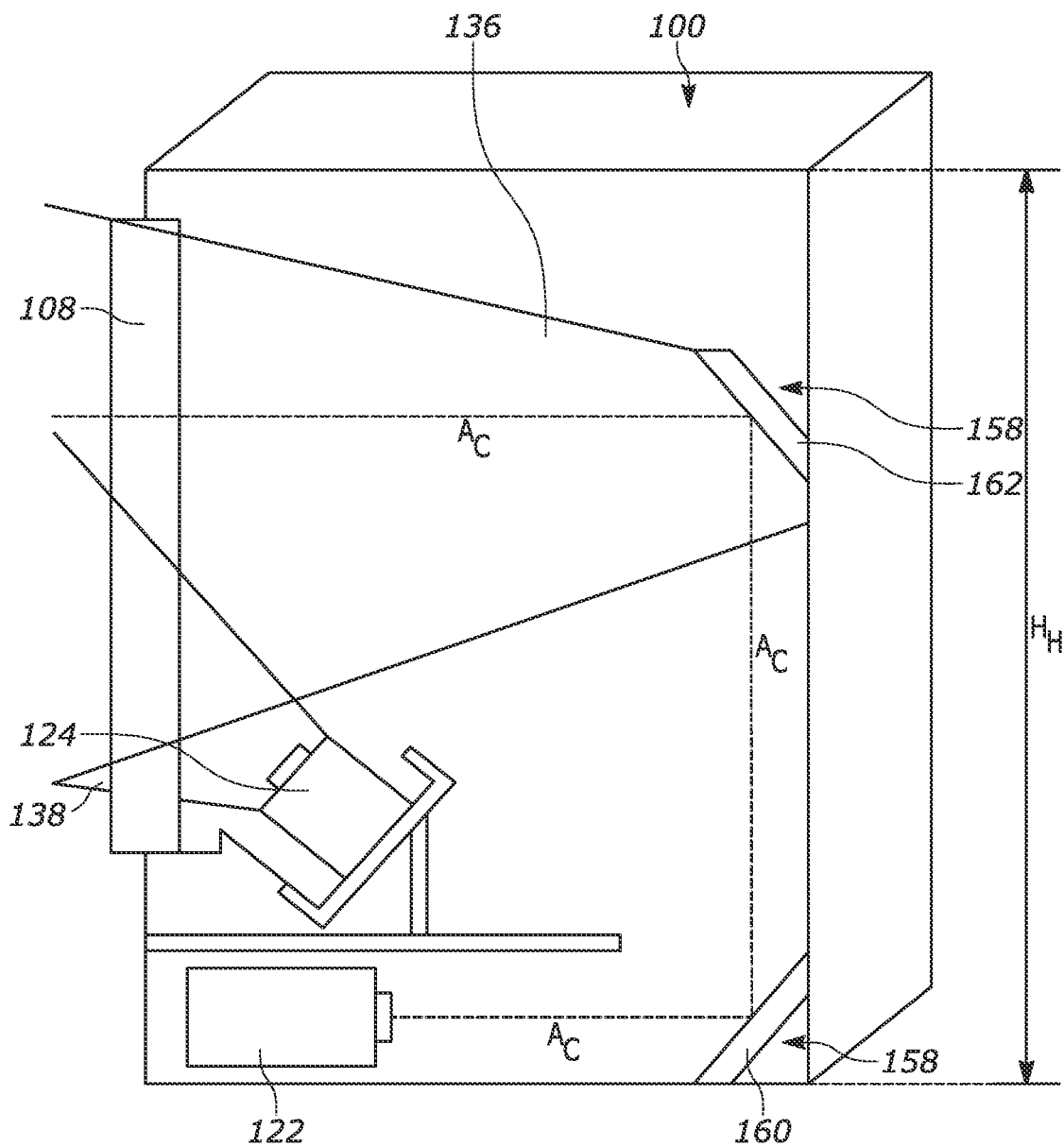
FIG. 10 illustrates a side cross-sectional view of an example imaging device showing a mirror arrangement directing a central axis of the first FOV of the first imaging assembly.

Turning to FIG. 10, a side cross-sectional view of the imaging device 100 shows a mirror arrangement 158 positioned within the housing 102. The mirror arrangement 158 is shown having two mirrors, a first mirror 160 and an output mirror 162. However, in other arrangements not depicted herein, the mirror arrangement 158 could include more than two mirrors or only a single output mirror 162. The output mirror 162 is positioned to direct the first FOV 136 through the window 108. Specifically, the output mirror 162 is to direct a central axis $A_c$ of the first imaging sensor 122, thereby directing the first FOV 136. The central axis $A_c$ is positioned along the y-axis within a top half of the housing height $H_H$ by the output mirror 162 or, in other arrangements not herein depicted, directly by the first imaging sensor 122 without the use of a mirror arrangement 158. The central axis $A_c$ may have a range over which it may be adjusted to adjust the first FOV 136. The range may be between 0 and 25 degrees relative to normal to the window 108. The second imaging sensor 124 is located below the output mirror 162 along the y-axis or, in an arrangement without a mirror arrangement 158, below the central axis $A_c$ of the first imaging sensor 122. In the arrangement shown, the second imaging sensor 124 is located below the output mirror 162 along the y-axis and is oriented to direct the central axis $A_c$ substantially along the x-axis, the first mirror 160 redirects the central axis $A_c$ substantially along the y-axis, and the output mirror 162 redirects the central axis $A_c$ through the window 108. In an alternative arrangement not depicted herein, the second imaging sensor 124 may be located below the output mirror 162 along the y-axis and may be oriented to direct the central axis $A_c$ substantially along the y-axis, for example by being positioned where the first mirror 160 is shown in FIG. 10. This eliminates the need for the first mirror 160 as the output mirror 162 can redirect the central axis $A_c$ through the window 108. As discussed above, the second imaging sensor 124 may be positioned to direct the second FOV 138 upwardly with respect to the horizontal plane $P_H$ (shown in FIG. 2).

Figure 11:
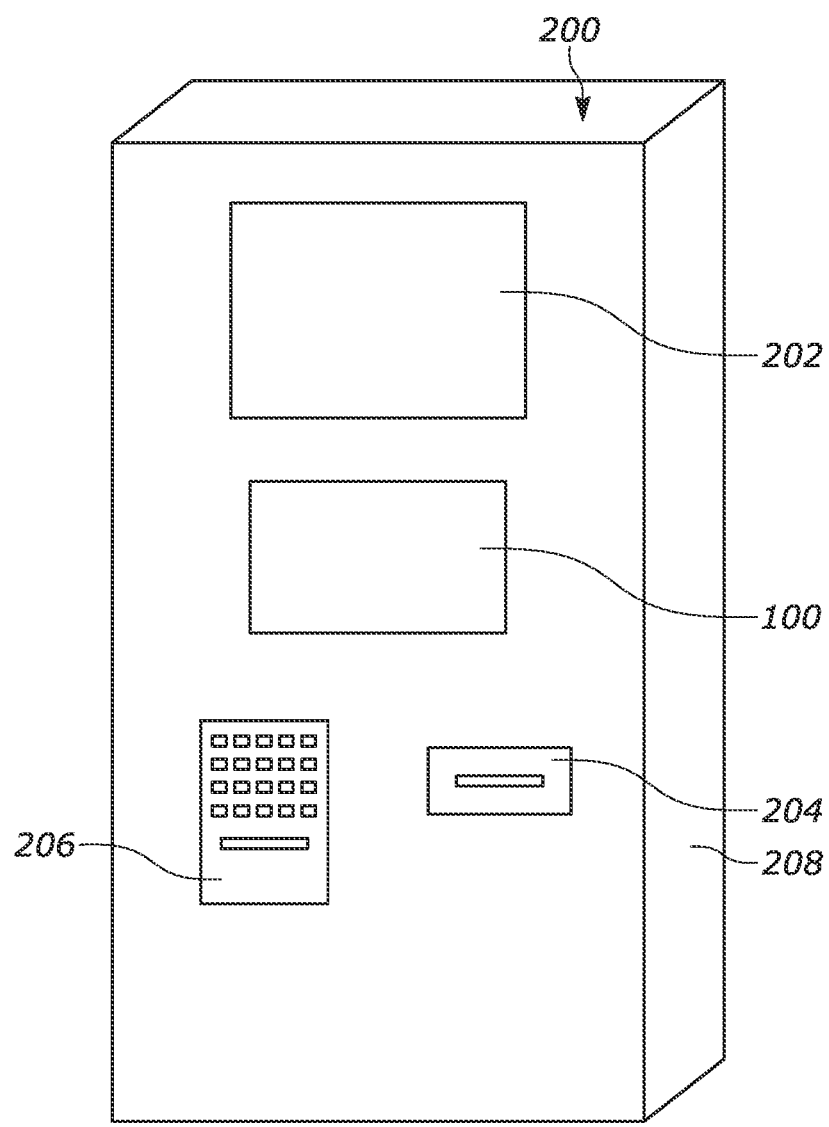
FIG. 11 illustrates an example imaging device placed within a kiosk.

FIG. 11 illustrates an imaging device 100 placed within a kiosk 200 below a display 202 of the kiosk 200. In some arrangements, the kiosk 200 may further include a printer 204 and a payment terminal 206. The kiosk 200 includes a housing 208, and the entire imaging device 100 fits inside the housing 208.

FIG. 12 illustrates an imaging device 100 configured for placement in a horizontal position. For example, the imaging device 100 may be placed to function as a table top or a platter across which items are scanned. The imaging device 100 is substantially the same as that shown in FIG. 1, including a housing 102, a first imaging assembly 104, and a second imaging assembly 106, and a window 108. Minor changes may be made to facilitate placement in a horizontal position. For example, the housing 102 may not include a baffle 134 (shown in FIG. 1) as the baffle 134 could interfere with the scanning of items. Instead, the housing 102 may include a platter 164 that protects the imaging device 100 from items scanned across the imaging device 100 that are likely to come into contact with the area in which the platter 164 is located.

Figure 13:
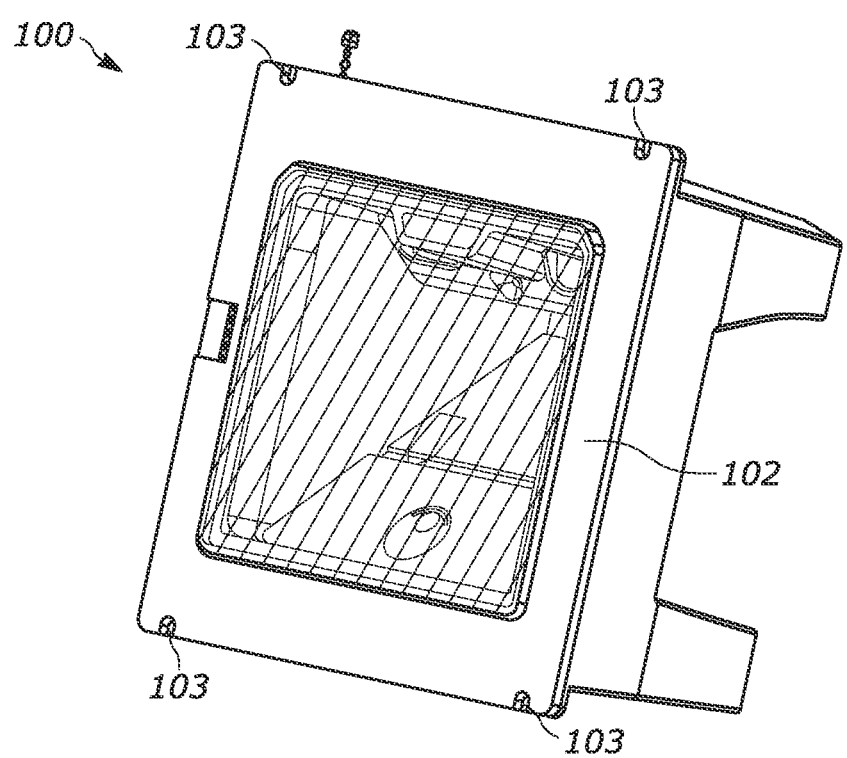
FIG. 13 illustrates an example imaging device sub-assembly for placement in, for example, the kiosk of FIG. 11.

FIG. 13 illustrates an imaging device 100 that is configured to be a sub-assembly for a larger scanning device, such as kiosk 200 shown in FIG. 10. To that end, the housing 102 may include connection points 103, such as holes for screws or other fastening mechanisms, for securing the imaging device 100 within the larger scanning device. The imaging device 100 may be configured for placement in a vertical position, a horizontal position, or an angled position. The housing 102 of the imaging device 100 may be contoured or otherwise configured to complement the larger scanning device into which the imaging device 100 will be placed. In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device configured for placement in a vertical position on a flat surface or for placement in a horizontal position, the imaging device comprising:
   a housing having a window that is optically transmissive, the housing having a housing width between a first side and a second side along a x-axis, a housing height between a top and a bottom along an y-axis, and a housing depth between a front and a back along a z-axis, the bottom located on the flat surface in the vertical position, the front aligned with the window, and the first side and the second side between the top and the bottom;
   a first imaging assembly including a first imaging sensor having a first field of view (FOV) extending through the window, the first imaging assembly being configured to decode indicia data captured within the first FOV, the first imaging sensor being a monochrome sensor; and
   a second imaging assembly including a second imaging sensor having a second field of view (FOV) extending through the window, the second imaging assembly being configured to capture images in the second FOV;
   the second imaging sensor positioned along the y-axis within a bottom portion of the housing height and along the z-axis within a front portion of the housing depth relative to the window, the second imaging sensor being configured to capture color images in the second FOV, the color images used for at least one of a video stream, a ticket switching application, a scan avoidance application, facial recognition, gesture recognition, a convolutional neural network based application, and product identification.

2. The imaging device of claim 1, further comprising an illumination emitter configured to generate illumination light visible through the window, the illumination emitter positioned along the y-axis within a top portion of the housing height.

3. The imaging device of claim 1, the bottom portion being a bottom third of the housing height along the y-axis.

4. The imaging device of claim 1, the front portion being within 1.5 inches of the front along the z-axis.

5. The imaging device of claim 2, the top portion being a top third of the housing height along the y-axis.

6. The imaging device of claim 1,
the bottom portion being a bottom half of the housing height along the y-axis,
a central axis of the first imaging sensor positioned along the y-axis within a top half of the housing height.

7. The imaging device of claim 6,
the first imaging sensor being positioned to direct the first FOV downwardly with respect to a horizontal plane,
the second imaging sensor being positioned to direct the second FOV upwardly with respect to a horizontal plane.

8. The imaging device of claim 7,
the first FOV directed downwardly with respect to the horizontal plane at an angle between 5 and 20 degrees, and
the second FOV directed upwardly with respect to the horizontal plane at an angle between 10 and 45 degrees.

9. The imaging device of claim 7,
the first FOV covering at least half of the window, and
the second FOV covering at least half of the window.

10. The imaging device of claim 2,
the second imaging sensor being positioned to direct the second FOV upwardly with respect to a horizontal plane,
the illumination emitter being positioned to direct the illumination light downwardly with respect to the horizontal plane.

11. The imaging device of claim 10, the illumination light directed to illuminate all of the second FOV up to four inches away from the front of the housing along the z-axis.

12. The imaging device of claim 1, the housing having a baffle adjacent a top of the window, the baffle configured to limit an illumination height of the illumination light generated by the illumination emitter.

* * * * *